126,730

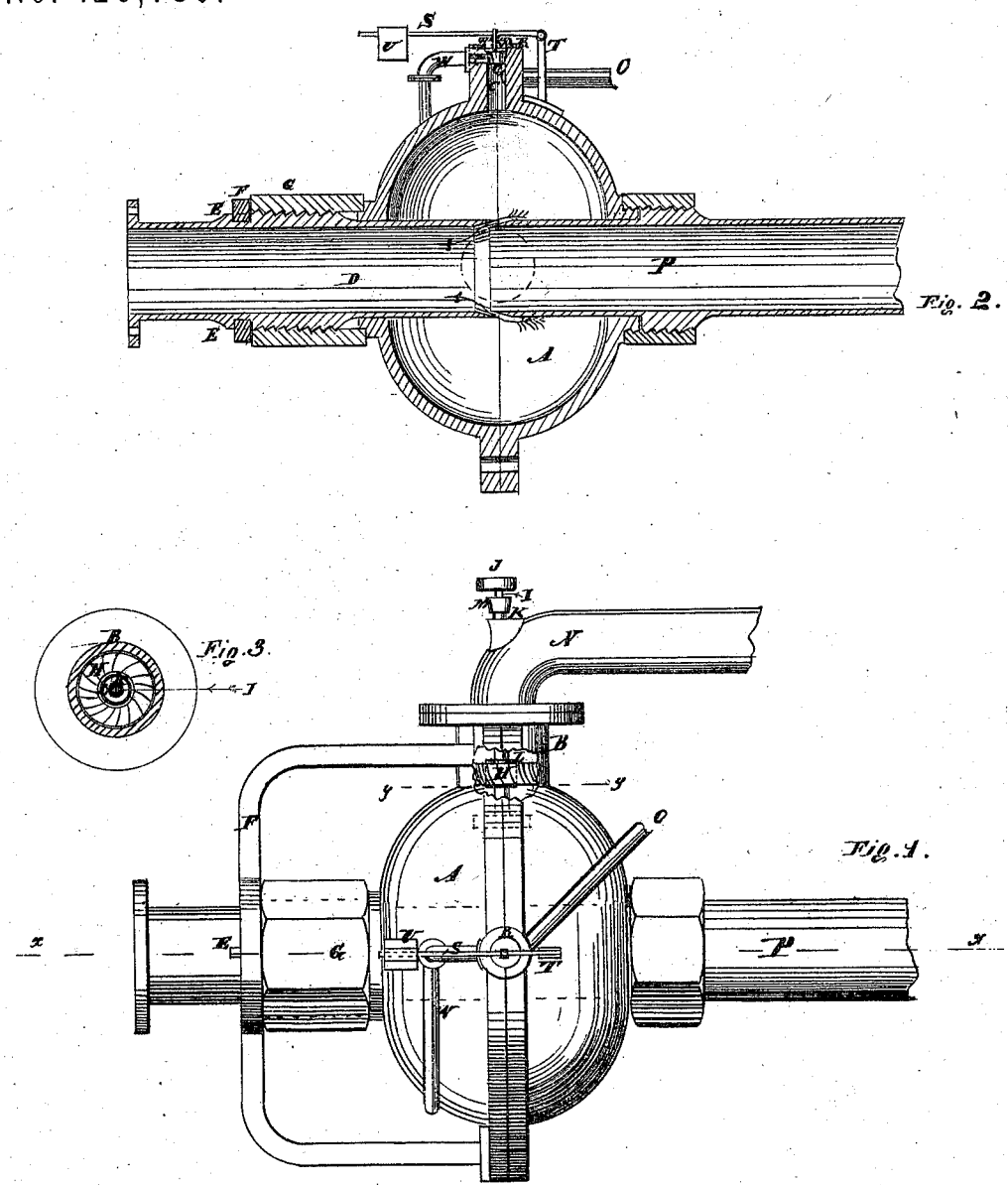

UNITED STATES PATENT OFFICE.

EDWARD B. MEATYARD, OF CHICAGO, ILLINOIS.

IMPROVEMENT IN WATER-ACCELERATORS.

Specification forming part of Letters Patent No. 126,730, dated May 14, 1872.

SPECIFICATION.

I, EDWARD B. MEATYARD, of Chicago, in the county of Cook and State of Illinois, have invented certain new and useful Improvements in Accelerators, of which the following is a specification, reference being had to the accompanying drawing, which forms a part hereof.

*Nature and Object of my Invention.*

My invention relates to devices usually employed to accelerate the flow of water in pipes, and for similar purposes, which devices are also sometimes called "injectors;" and the first part of my invention consists in the combination of an adjustable pipe with the chamber of an accelerator, and in the means employed for rendering the pipe adjustable, as will be hereafter more fully explained. The object of this part of my invention is to render the force of an accelerator capable of being regulated by means of the adjustable pipe. The second part of my invention consists in the combination of a current-wheel with an accelerating apparatus, in the manner hereafter more fully described; the object of this part of my invention being to enable me to utilize the current flowing into the accelerator, for the purpose of operating an air-pump and thereby assist the operation of the accelerator, as hereafter more fully explained. It also consists in providing an accelerating chamber with a pressure-valve, the purpose of which will hereafter fully appear.

*Description of the Drawing.*

Figure 1 represents a top or plan view of an accelerator embodying my improvements. Fig. 2 represents a vertical sectional view of the same, through the line $x$ $x$ of Fig. 1; and Fig. 3 represents a vertical sectional view through the line $y$ $y$, of Fig. 1.

*General Description.*

A represents the chamber of an accelerator. This chamber may be made in two sections provided with flanges, for the purpose of convenience in manufacturing the same, which sections may be united by means of bolts and nuts, or other convenient method. B is a tubular projection upon one side of the chamber A. C is a perforation through the uppermost parts of the flanges of the chamber A. D is an adjustable pipe entering the chamber A, and having its inner end chamfered in the manner shown. A portion of this pipe, exterior to the chamber A, is thicker than the remaining part, and upon this thicker portion a male-screw thread is run. E is a lock-bar running longitudinally along the pipe D, and terminating in the raised portion thereof, above described. F is a brace passing around the pipe D and attached to the chamber A. This brace is provided with a groove corresponding to the lock-bar E. G is a nut provided with a female-screw, and this nut is run upon the male screw upon the pipe D, as shown. It will be observed, by reference to the drawing, that the thicker part of the pipe D begins at the inner side of the brace F, and extends toward the chamber A, but not entirely to it, while the nut G fills the entire space between the said brace and the said chamber. Let it be understood that this brace is rigidly attached to the chamber A, and passes freely around the pipe D and over the lock-bar E; it will then be perceived that, by turning the nut G, the pipe D may be moved so as to extend a greater or less distance within the chamber A, as the lock-bar E keeps it from turning as the nut G is turned. The nut G may be made to rest against the chamber A in the manner shown, and the exterior end of the pipe D may be provided with a rim or flange, for the purpose of conveniently attaching any discharge-pipe to it. H is any current-wheel which may be operated within the tubular projection B, in the manner herein described. This current-wheel is rigidly attached to the shaft I, which has suitable bearings in the chamber A, and tubular projection B. J is a band-wheel rigidly attached to the shaft I. K is a tube or sleeve passing freely over the shaft I, rigidly attached to the inner end of which tube is the plug L. M is any convenient device upon the outer end of the tube or sleeve K, which may be grasped for the purpose of moving the said sleeve longitudinally upon the shaft I. The current-wheel H has a core into which the plug L may be inserted. N is a supply-pipe through which water, under pressure, is passed into the chamber A. When it is desired to operate the current-wheel E, the plug L is pushed into the hollow core of the wheel, and the water operates the wheel by pressing against and passing between the blades of the wheel. By withdrawing the plug L from the said core the water passes through the latter in sufficient quantities to cause a cessation of the revolution of the current-wheel. A band is passed over the wheel J and connected to the gearing of any suitable air-pump. O is a pipe entering the chamber A and connecting with the air-pump. The object of using an air-pump in this connection will be hereafter more fully explained. P is a pipe entering the chamber A. This pipe has a chamfered end, corresponding to the chamfered end of the pipe D, and it is rigidly attached to the chamber A in the manner shown, or in any convenient manner; it is also intended to be attached at its exterior end to any discharge-pipe, when the accelerator is used to aid the flow of the matter passing through such discharge pipe. The air-pump above referred to is used for the purpose of exhausting the air from the pipe P and pipes connecting with it. Q is a pressure valve resting in the perforation C. R is a cap covering the perforation C, and so formed as to admit of an upward movement of the pressure-valve. S is a lever-bar, common in connection with pressure-valves, and is hinged or pivoted to the standard T, and provided with the weight U. V is a rod or bar rigidly attached to the valve Q, and passing through the cap R freely, and through which the lever-bar S freely passes. W is a discharge-pipe entering the perforation C, its inner opening being sealed and opened as the valve Q passes down or up. The operation of this pressure-valve is similar to the operation of any ordinary pressure-valve. The water entering the chamber A, under pressure, enters the pipe D through the chamfered opening, and flows in the direction indicated by the arrows there placed. When it is desired to increase the velocity of the flow of matter through the pipe P, or to equalize the current therein, the pressure and supply of water is increased in the pipe N, and the chamfered opening widened by means of the adjustable pipe D; or the same result may be obtained by widening the chamfered opening, and increasing the supply of water, without increasing the pressure, though not to the same extent as if the pressure were also increased, as will be perceived; it being understood that the force of water entering the chamfered opening, under a given pressure, will be as its volume into a power of its velocity greater than one. The tendency of the water entering the chamfered opening will be to draw or suck the contents of the pipe P after it, thus increasing and equalizing the current in the said pipe.

It will sometimes be found expedient to exhaust the air from the pipe P, especially at the commencement of the operations, and I have utilized the force of the water entering the chamber A, so that the current-wheel H is made to operate an air-pump for this purpose, and by providing the chamber A with a pressure-valve so that the pressure therein need not exceed a given point. Steam or air may also be used instead of water.

Claims.

Having described the nature, construction, and operation of my invention, what I claim, and desire to secure by Letters Patent, is—

1. In combination with the chamber A, in an accelerator, an adjustable-pipe D, when operating substantially as and for the purpose specified.

2. The combination of the chamber A, adjustable pipe D, pipe P, nut G, and brace F, as and for the purpose shown and set forth.

3. In combination with an accelerator, any current-wheel H, when operating substantially as and for the purpose set forth.

4. The combination and arrangement of the tubular projection B, pipe N, chamber A, and shaft I, in an accelerator, when the said shaft is provided with a current-wheel, H, substantially as shown and described.

5. The combination and arrangement of the shaft I, tube or sleeve K provided with the plug L, and current-wheel H, as and for the purpose specified.

6. In combination with the chamber A, in an accelerator, any pressure-valve, Q, for the purpose set forth.

EDWARD B. MEATYARD.

Witnesses:
FRANCIS F. WARNER,
HEINR. F. BRUNS.